US008013883B2

(12) United States Patent
Sato et al.

(10) Patent No.: US 8,013,883 B2
(45) **Date of Patent: *Sep. 6, 2011**

(54) IMAGE FORMING APPARATUS

(75) Inventors: Shougo Sato, Seto (JP); Keiichiro Egami, Nagoya (JP); Yosuke Mase, Aichi-ken (JP); Yusuke Nakata, Nagoya (JP); Kayo Hasui, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 327 days.

This patent is subject to a terminal disclaimer.

(21) Appl. No.: 12/201,081

(22) Filed: Aug. 29, 2008

(65) Prior Publication Data

US 2009/0060575 A1 Mar. 5, 2009

(30) Foreign Application Priority Data

Aug. 30, 2007 (JP) ................................ 2007-224342

(51) Int. Cl.
*G01D 15/06* (2006.01)
*B41J 29/13* (2006.01)

(52) U.S. Cl. ............ 347/170; 347/3; 347/108; 347/129; 347/130; 347/138; 347/152; 347/245; 347/263

(58) Field of Classification Search .................. 347/108, 347/152, 170, 263
See application file for complete search history.

(56) References Cited

U.S. PATENT DOCUMENTS 6,830,401 B1 * 12/2004 Hwang et al. ................ 400/693
6,923,535 B2 * 8/2005 Koga ........................... 347/108
6,961,152 B1 * 11/2005 Watanabe et al. ............ 358/296
6,965,392 B2 * 11/2005 Ogushi et al. ................ 347/222
7,066,569 B2 * 6/2006 Ishizuka et al. ................ 347/37
D529,951 S * 10/2006 Katayama et al. ............ D18/53
7,172,354 B1 * 2/2007 Nissim ......................... 400/642
D548,776 S * 8/2007 Egami et al. .................. D18/50
7,431,448 B2 * 10/2008 Yoshiyama ................... 347/108
7,553,012 B2 * 6/2009 Kozaki et al. ................ 347/108
7,731,352 B2 * 6/2010 Yonekawa .................... 347/108
7,733,540 B2 * 6/2010 Moribe ......................... 358/474
7,764,406 B2 * 7/2010 Sato ............................ 358/474
2003/0206224 A1 * 11/2003 Sakakibara et al. .......... 347/108
2004/0145112 A1 * 7/2004 Matsutomo et al. .......... 271/207
2004/0234292 A1 * 11/2004 Sato et al. ..................... 399/107
2006/0018693 A1 * 1/2006 Nobe et al. .................... 399/405
2006/0056875 A1 * 3/2006 Karasawa et al. ............. 399/107
(Continued)

FOREIGN PATENT DOCUMENTS

JP 2005-091389 4/2005
(Continued)

*Primary Examiner* — Ryan Lepisto
(74) *Attorney, Agent, or Firm* — Banner & Witcoff, Ltd.

(57) ABSTRACT

An image forming apparatus is described. The image forming apparatus may include a first casing and a second casing above the first casing. The second casing is provided with an upper surface including a generally horizontal surface, a lower surface extending beyond the upper surface in a generally horizontal direction and a side surface connecting an end edge of the upper surface and an end edge of the lower surface with each other over the whole area. The first casing is provided with an upper surface coming into contact with the lower surface of the second casing over the whole area and a side surface including a generally vertical surface. An inclined surface connecting the generally vertical surface of the first casing and the generally horizontal surface of the second casing with each other, is provided continuously along the first casing and the second casing.

7 Claims, 4 Drawing Sheets

U.S. PATENT DOCUMENTS

| | | | | |
|---|---|---|---|---|
| 2006/0125904 | A1* | 6/2006 | Shokai | 347/108 |
| 2007/0071493 | A1 | 3/2007 | Eguchi | |
| 2007/0134036 | A1* | 6/2007 | Sato et al. | 399/367 |
| 2007/0139506 | A1* | 6/2007 | Yonekawa | 347/108 |
| 2007/0160381 | A1* | 7/2007 | Sato et al. | 399/107 |
| 2007/0211131 | A1* | 9/2007 | Iijima | 347/108 |
| 2007/0236552 | A1* | 10/2007 | Suzuki et al. | 347/108 |
| 2008/0049260 | A1* | 2/2008 | Moribe et al. | 358/296 |

FOREIGN PATENT DOCUMENTS

| | | |
|---|---|---|
| JP | 2005-242267 | 9/2005 |
| JP | 2005-258025 | 9/2005 |
| JP | 2005-301154 | 10/2005 |
| JP | 2007-096889 | 4/2007 |

* cited by examiner

IMAGE FORMING APPARATUS

CROSS REFERENCE TO RELATED APPLICATION

This application claims priority to Japanese Patent Application No. 2007-224342 filed on Aug. 30, 2007, the disclosures of which are hereby incorporated into the present application by reference.

TECHNICAL FIELD

The present invention relates to an image forming apparatus.

BACKGROUND

Image processing apparatuses as image forming apparatuses include a composite image processing apparatus including a first image processing section functioning as a printer and a second image processing section provided above the first image processing section for functioning as a scanner, for example.

The first image processing section is provided with a top cover opening/closing the upper surface of the first image processing section by swinging on a pivot provided on an end portion thereof, and the second image processing section is arranged above the top cover.

In this image processing apparatus, the user can maintain the first image processing section by opening the top cover along with the second image processing section.

In this image processing apparatus, an end portion of the second image processing section is connected to a pillar protruding from only a portion around the pivot of the top cover. In other words, only the pillar connecting the end portions of the second image processing section and the top cover with each other is interposed between the second image processing section and the top cover. The second image processing section arranged above the top cover is heavy as a rule. Therefore, it may not be possible to ensure sufficient strength between the second image processing section and the top cover.

SUMMARY

One aspect of the present invention may provide an image forming apparatus capable of ensuring strength around an image scanning section.

The same or different aspect of the present invention may provide an image forming apparatus including: a first casing including an image forming section for forming an image on a recording medium; and a second casing, arranged above the first casing, including an ejecting section to which the recording medium formed with the image at the image forming section is ejected, and an image scanning section provided above the ejecting section and capable of reading image information from a document, wherein the second casing is provided with an upper surface including a generally horizontal surface, a lower surface extending beyond the upper surface in a generally horizontal direction and a side surface connecting an end edge of the upper surface and an end edge of the lower surface with each other over the whole area, the first casing is provided with an upper surface coming into contact with the lower surface of the second casing over the whole area and a side surface including a generally vertical surface, and an inclined surface connecting the generally vertical surface of the first casing and the generally horizontal surface of the second casing with each other, is provided continuously along the first casing and the second casing.

DETAILED DESCRIPTION

Embodiments of one or more aspects of the present invention are now described with reference to the drawings.

First Embodiment

1. Overall Structure of Printer

Figure 1:
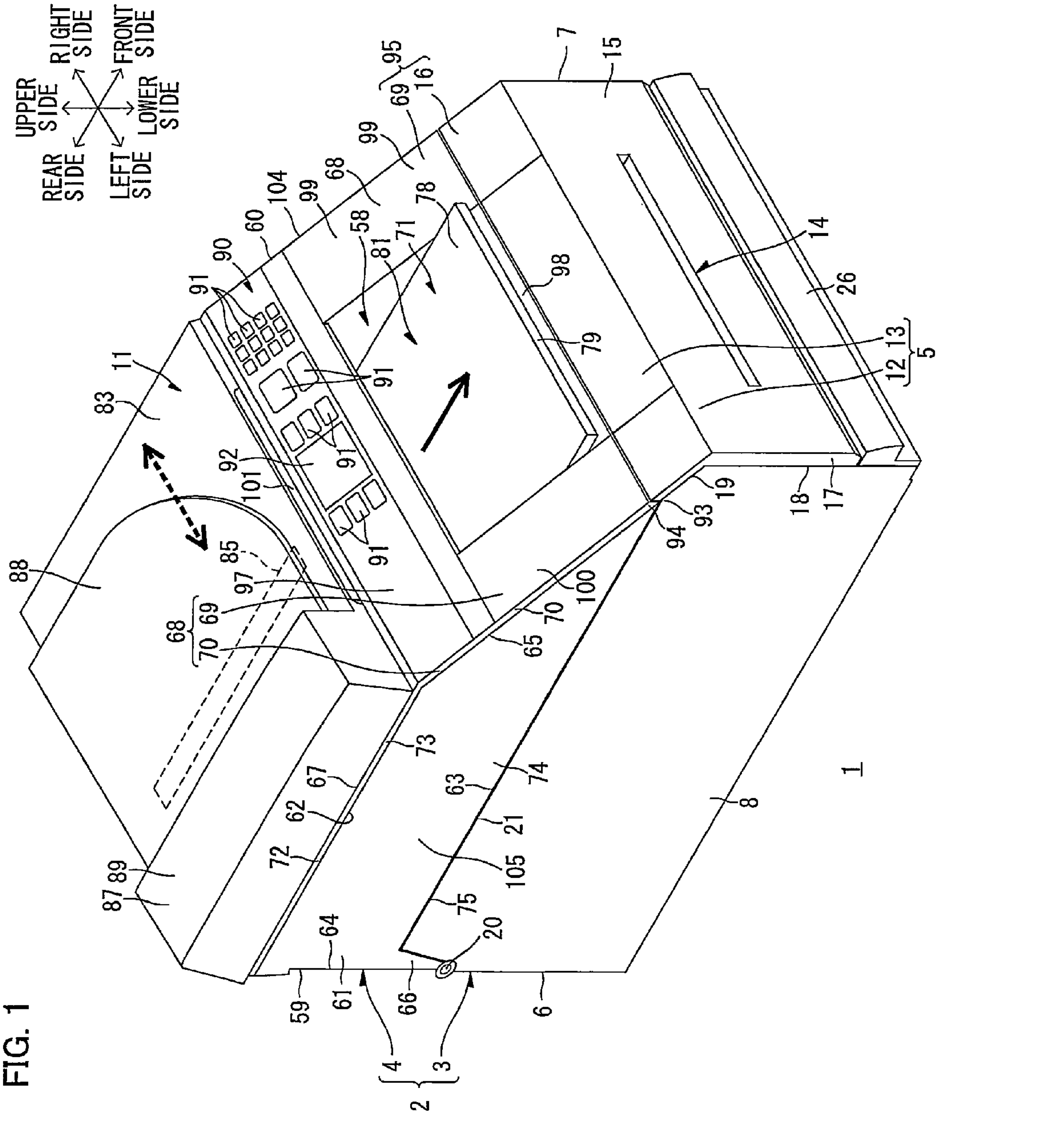
FIG. 1 is a left-side perspective view showing illustrative aspects of a printer as an example of an image forming apparatus according to one or more aspects of the present invention as viewed from the upper front side, with a second casing located on a closing position.
Figure 2:
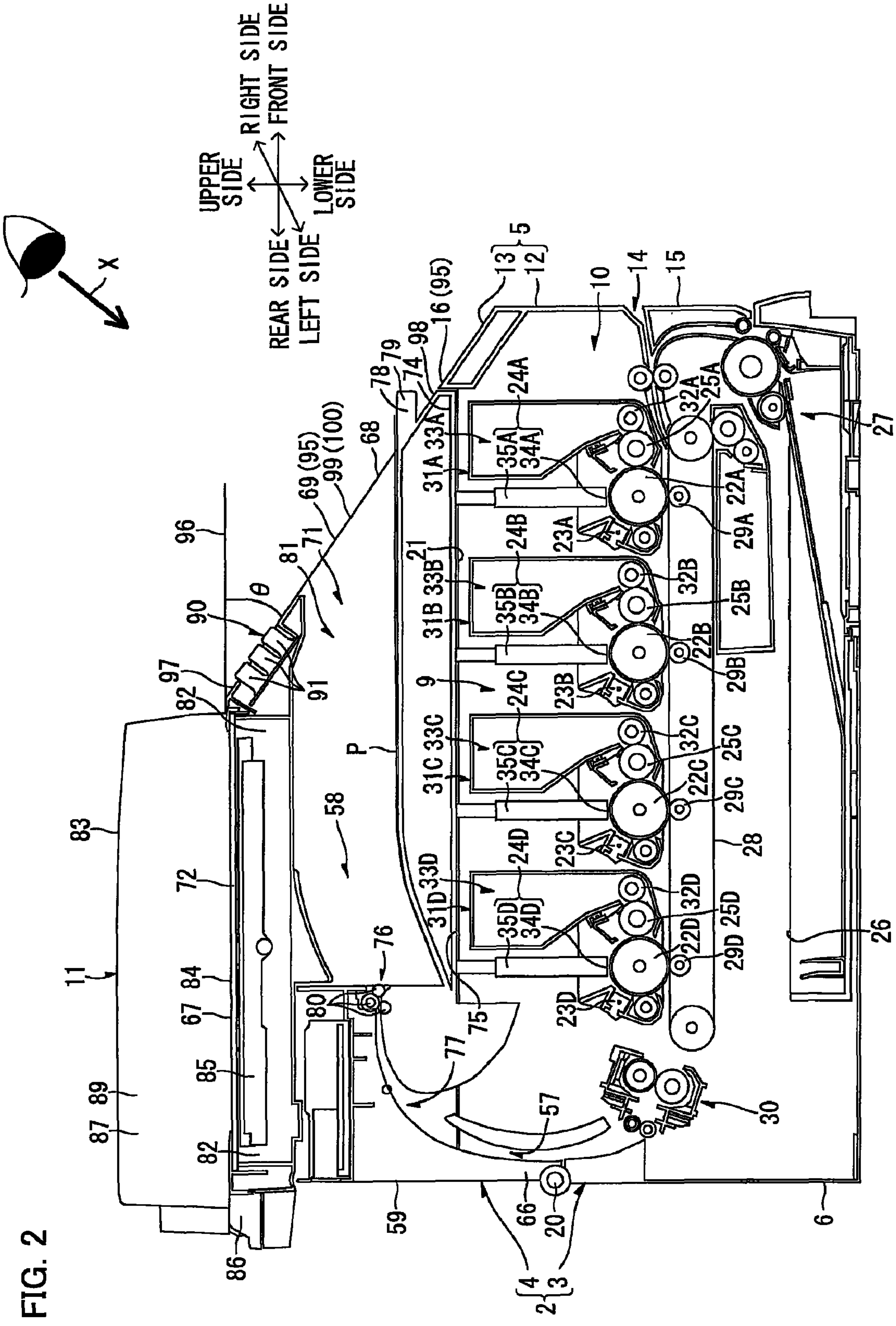
FIG. 2 is a left-side sectional view of the printer shown in FIG. 1.
Figure 3:
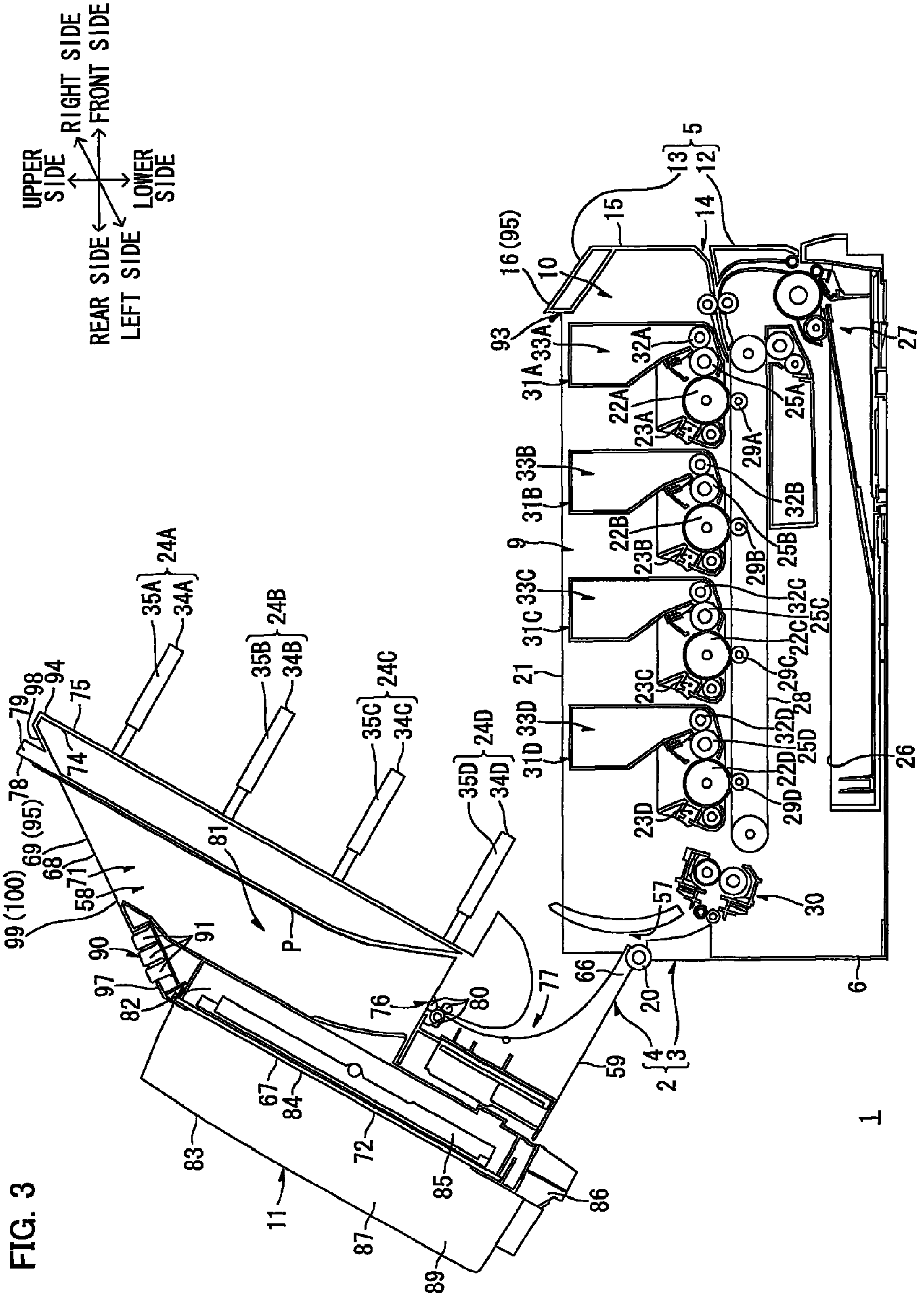
FIG. 3 shows a state where the second casing is located on an opening position in FIG. 2.

FIG. 1 is a left-side perspective view showing illustrative aspects of a printer as an example of an image forming apparatus according to one or more aspects of the present invention as viewed from the upper front side, with a second casing located on a closing position. FIG. 2 is a left-side sectional view of the printer shown in FIG. 1. FIG. 3 shows a state where the second casing is located on an opening position in FIG. 2.

In the following description, it is assumed that the anteroposterior direction, the top-and-bottom direction and the right-and-left direction (width direction) of the printer are along arrows shown in FIGS. 1 to 4. A generally horizontal direction includes the anteroposterior and right-and-left directions, and a generally vertical direction includes the top-and-bottom direction.

As shown in FIG. 1, this printer 1 includes a casing 2 generally in the form of a rectangular parallelepiped longitudinal in the anteroposterior direction, more specifically, generally in the form of a home plate in left-side elevational view. An image forming section 10 and an image scanning section 11 (see FIG. 2) described later are provided in the casing 2, and this printer 1 is the so-called composite printer.

The casing 2 is divided into a lower first casing 3 and an upper second casing 4. While the second casing 4 opens/closes the upper surface (a first upper surface 21 described later) of the first casing 3 by pivoting with respect to the first casing 3 as described later, the following description is made on the premise that the second casing 4 is located on a position (closing position) closing the first upper surface 21, unless otherwise stated.

(1) First Casing (1-1) Shape of First Casing

The first casing 3 is generally in the form of a hollow rectangular parallelepiped longitudinal in the anteroposterior direction and slightly thin in the top-and-bottom direction.

More specifically, the front wall (referred to as a first front wall 5 as an example of a first inclined wall), the rear wall (referred to as a first rear wall 6), the right wall (referred to as a first right wall 7) and the left wall (referred to as a first left wall 8) of the first casing 3 generally vertically extend, and the outer surfaces of the respective walls also generally vertically extend. The first right wall 7 and the first left wall 8 are examples of a first side wall.

The first front wall 5 integrally includes a generally vertically extending vertical portion 12 and an inclined portion 13 inclinatorily extending upward toward an oblique rear side (hereinafter referred to as an inclination direction) continuously from the upper end of the vertical portion 12. The vertical portion 12 is in the form of a rectangle longitudinal in the width direction in front elevational view. The outer (front) surface (referred to as a first front surface 15) of the vertical portion 12 is a generally vertical surface generally vertically extending similarly to the vertical portion 12. A slit (referred to as a manual feeding slit 14) longitudinal in the width direction is formed generally at the center of the vertical portion 12 to anteroposteriorly pass through the vertical portion 12. The inclined portion 13 is in the form of a rectangle having the same width-directional size as the vertical portion 12, and continuous over the whole width direction with respect to the vertical portion 12. The outer (front) surface (referred to as a first inclined surface 16) of the inclined portion 13 is inclined in the inclination direction, similarly to the inclined portion 13. The width-directional end faces (referred to as first end faces 17) of the first front wall 5 are continuously provided on both of the vertical portion 12 and the inclined portion 13, and continuously extend rearward from the width-directional end edges of the first front surface 15 and the first inclined surface 16. The first end faces 17 extend in directions generally orthogonal to the respective ones of the first front surface 15 and the first inclined surface 16. The rear end edge of the upper end of the first end face 17 forms the width-directional end edge of the rear end face of the upper end portion of the inclined portion 13, and extends in the generally vertical direction. The rear end face of the upper end portion of the inclined portion 13 generally vertically extends over the whole area.

Both of the first right and left walls 7 and 8 are in the form of generally rectangular flat plates longitudinal in the anteroposterior direction. More specifically, the first right and left walls 7 and 8 extend in a direction intersecting with the first inclined surface 16. The front upper end portions of the first right and left walls 7 and 8 are notched along the inclination direction. More specifically, the front end edges of the first right and left walls 7 and 8 have lower front end edges 18 extending in the generally vertical direction and upper front end edges 19 extending in the inclination direction continuously from the upper ends of the lower front end edges 18. The first right and left walls 7 and 8 are connected to the corresponding first end faces 17 respectively. The lower front end edges 18 are shifted rearward from the corresponding width-directional end edges of the first front surface 15, and the upper front end edges 19 are shifted rearward from the corresponding width-directional end edges of the first inclined surface 16. In other words, the lower front end edges 18 and the width-directional end edges of the first front surface 15 are not coincident with each other, and the upper front end edges 19 and the width-directional end edges of the first inclined surface 16 are not coincident with each other either. The rear upper end portions of the first right and left walls 7 and 8 are notched along a direction connecting a lower portion on the oblique rear side and an upper portion on an oblique front side with each other. A shaft (referred to as a pivoting shaft 20) extending along the width direction is provided on the lower ends of the notched portions of the rear upper end portions of the first right and left walls 7 and 8.

The upper surface (referred to as the first upper surface 21) of the first casing 3 is anteroposteriorly sandwiched between the aforementioned front and rear notched portions of the first right and left walls 7 and 8, and extends in the generally horizontal direction. An opening (referred to as amounting port 9) is formed on the first upper surface 21 (see FIG. 3), so that the interior of the first casing 3 is exposed upward through the mounting port 9. The front end edge of the first upper surface 21 is connected to the lower end edge of the rear end face of the upper end portion of the inclined portion 13. Thus, the front end portion of the first upper surface 21 and the rear end face of the upper end portion of the inclined portion 13 form a step (referred to as a first step 93), inverted L-shaped in left-side elevational view, on the portion connecting the first upper surface 21 and the inclined portion 13 with each other.

Thus, the contour of the first casing 3 around the upper portion in left-side elevational view extends upward toward the oblique front side from the pivoting shaft 20 on the rear notched portion of the first left wall 8, thereafter generally horizontally extends frontward on the first upper surface 21, then slightly extends in the generally vertical direction from the rear end of the upper front end edge 19 on the first step 93, and thereafter extends downward in the inclination direction on the first inclined surface 16.

(1-2) Image Forming Section

As shown in FIG. 2, the image forming section 10 is provided in the first casing 3. The image forming section 10 is provided with four photosensitive drums 22A to 22D as an example of an image carrier parallelly arranged in the anteroposterior direction. The surfaces of the photosensitive drums 22A to 22D are uniformly charged by scorotron chargers 23A to 23D, and then electrostatic latent images based on image data are formed thereon with light applied from exposing units 24A to 24D. The respective electrostatic latent images are visualized by toners (developing agents) carried on developing rollers 25A to 25D, so that toner images are formed on the surfaces of the photosensitive drums 22A to 22D.

Sheets P as an example of a recording medium are stored in a sheet feeding tray 26 provided on a lower portion of the first casing 3, and transported to a transport belt 28 by various rollers provided on a sheet feeding section 27 while changing the direction from the front side to the rear side. The sheet feeding tray 26 is detachably mountable to the first casing 3 from the front side under the manual feeding slit 14 (see FIG. 1). The transport belt 28 is opposed to the photosensitive drums 22A to 22D. The toner images of respective colors formed on the photosensitive drums 22A to 22D are successively superposed and transferred onto the sheet P transported by the transport belt 28, due to the functions of transfer rollers 29A to 29D to which transfer bias is applied. After the toner images of four colors are transferred, the sheet P is transported to a fixing section 30. After the toner images transferred onto the sheet P are thermally fixed on the fixing section 30, the sheet P is ejected to an ejecting section 58 described later by various rollers, while changing the direction from the rear side to the front side.

Process cartridges 31A to 31D partially forming the image forming section 10 are parallelly arranged in the first casing 3 along the generally horizontal direction, and detachably mountable to the first casing 3 through the aforementioned mounting port 9 of the first upper surface 21. The process cartridges 31A to 31D mainly include the photosensitive drums 22A to 22D, the scorotron chargers 23A to 23D, the developing rollers 25A to 25D, feed rollers 32A to 32D and toner accommodation chambers 33A to 33D. The process cartridges 31A to 31D are identical in structure to one another, except that the colors of the toners accommodated in the toner accommodation chambers 33A to 33D are different from one another. The toners accommodated in the toner accommodation chambers 33A to 33D are fed to the developing rollers 25A to 25D through the feed rollers 32A to 32D respectively.

The exposing units 24A to 24D include LED elements 34A to 34D and pillars 35A to 35D. The pillars 35A to 35D extend in the top-and-bottom direction along the toner accommodation chambers 33A to 33D at the back of the toner accommodation chambers 33A to 33D. The LED elements 34A to 34D are mounted on the lower ends of the pillars 35A to 35D, and approximated to the photosensitive drums 22A to 22D from above at prescribed intervals. The upper ends of the pillars 35A to 35D are connected to the lower surface (a second lower surface 75 described later) of the second casing 4.

(2) Second Casing (2-1) Shape of Second Casing

As shown in FIG. 1, the second casing 4 is generally in the form of a box, and the left side surface thereof is generally in the form of a trapezoid having an inclined portion on the front side.

More specifically, the rear wall (referred to as a second rear wall 59), the right wall (referred to as a second right wall 60) and the left wall (referred to as a second left wall 61) of the second casing 4 generally vertically extend, and the outer surfaces of the respective walls also generally vertically extend. The second right wall 60 and the second left wall 61 are examples of a second side wall.

The second right and left walls 60 and 61 are in the form of generally trapezoidal flat plates. The each contour of the second right and left walls 60 and 61 in left-side elevational view has an upper base 62, a lower base 63, a rear connecting portion 64 and a front connecting portion 65. The upper base 62 extends in the generally horizontal direction. The lower base 63 extends beyond the upper base 62 in the generally horizontal direction under the upper base 62. The rear connecting portion 64 extends in the generally vertical direction, and connects the rear ends of the upper and lower bases 62 and 63 with each other. The front connecting portion 65 extends in the aforementioned inclination direction, and connects the front ends of the upper and lower bases 62 and 63 with each other. Generally triangular convexes 66 narrowed downward are integrally provided on the rear ends of the lower bases 63 of the second right and left walls 60 and 61 respectively. The pivoting shaft 20 of the first casing 3 is connected to the lower ends of the convexes 66. Referring to FIG. 2, the downstream end portions (lower end portions) of the convexes 66 in the protrusive direction are located around intermediate portions of the pillars 35A to 35D mounted with the LED elements 34A to 34D in the height direction. When the second casing 4 is opened/closed as described later, therefore, the LED elements 34A to 34D less anteroposteriorly move in the first casing 3, to hardly interfere with the toner accommodation chambers 33A to 33D.

As shown in FIG. 1, the front wall (referred to as a second front wall 68 as an example of a second inclined wall) of the second casing 4 is in the form of a rectangle having the same width-directional size as the first front wall 5, and extends in the aforementioned inclination direction. The outer (front) surface (referred to as a second inclined surface 69) of the second front wall 68 is inclined in the inclination direction, similarly to the second front wall 68. The width-directional end faces (referred to as second end faces 70) of the second front wall 68 extend downward toward the oblique rear side continuously from the width-directional end edges of the second inclined surface 69. The second end faces 70 extend in a direction orthogonal to the second inclined surface 69. The front end edges of the lower ends of the second end faces 70 form the width-directional end edges of the front end face of the lower end portion of the second front wall 68, and extend in the generally vertical direction. The front end face of the lower end portion of the second front wall 68 generally vertically extends over the whole area. In the second front wall 68, an opening (referred to as an ejecting port 71) generally rectangular in front elevational view is formed on a position slightly shifting downward from a generally central portion of the second inclined surface 69. The ejecting port 71 is surrounded by the second inclined surface 69 over the whole periphery. In the following description, the region of the second inclined surface 69 on the upper side of the ejecting port 71 is referred to as an upper inclined surface 97, the region on the lower side of the ejecting port 71 is referred to as a lower inclined surface 98, the region on the right side of the ejecting port 71 is referred to as a right inclined surface 99, and the region on the left side of the ejecting port 71 is referred to as a left inclined surface 100.

The upper inclined surface 97 is provided with an operation panel 90. A plurality of buttons 91 and a display screen 92 of liquid crystal, for example, are provided on the operation panel 90 in line along the width direction. The user can control operation of the printer 1 (at least either the image forming section 10 or the image scanning section 11) by operating any of the buttons 91, and the operating situation of the printer 1 is displayed on the display screen 92 and visually recognized by the user.

The front connecting portions 65 of the second right and left walls 60 and 61 are connected to the corresponding second end faces 70. The front connecting portions 65 are shifted downward toward the oblique rear side from the corresponding width-directional end edges of the second inclined surface 69, so that the front connecting portions 65 and the width-directional end edges of the second inclined surface 69 are not coincident with each other. The second right and left walls 60 and 61 extend in a direction intersecting with the second inclined surface 69.

The upper wall (referred to as a second upper wall 72) of the second casing 4 is generally in the form of a rectangle longitudinal in the width direction in plan view, extends in the generally horizontal direction, and is extended between the generally whole areas of the upper bases 62 of the second right and left walls 60 and 61. The upper surface (the upper surface of the second casing 4, referred to as a second upper surface 67) of the second upper wall 72 also extends in the generally horizontal direction, similarly to the second upper wall 72. The front end edge of the second upper wall 72 is connected to the upper end edge of the second front wall 68. The rear end edge of the second upper wall 72 is connected to the upper end edge of the second rear wall 59. The width-directional end faces (referred to as third end faces 73) of the second upper wall 72 extend downward continuously from the width-directional end edges of the second upper surface 67. The third end faces 73 are orthogonal to the second upper surface 67. The upper bases 62 of the second right and left walls 60 and 61 are connected to the corresponding third end faces 73 respectively. The upper bases 62 are shifted downward from the corresponding width-directional end edges of the second upper surface 67, so that the upper bases 62 and the width-directional end edges of the second upper surface 67 are not coincident with each other.

The lower wall (referred to as a second lower wall 74) of the second casing 4 is generally rectangular in bottom plan view, extends in the generally horizontal direction, and is provided between the generally whole areas of the lower bases 63 of the second right and left walls 60 and 61. The lower surface (referred to as the second lower surface 75) of the second lower wall 74 also generally horizontally extends, similarly to the second lower wall 74. The second lower surface 75 is generally identical in size to the first upper surface 21 of the first casing 3, and longer than the second upper surface 67 frontward in the generally horizontal direction. The right surface (referred to as a second right surface 104, including the right third end face 73) of the aforementioned second right wall 60 connects the right end edge of the second upper surface 67 and the right end edge (the right lower base 63) of the second lower surface 75 over the whole areas, while the left surface (referred to as a second left surface 105, including the left third end face 73) of the second left wall 61 similarly connects the left end edge of the second upper surface 67 and the left end edge (the left lower base 63) of the second lower surface 75 over the whole areas. The second right and left faces 104 and 105 form the width-directional side surfaces of the second casing 4. As shown in FIG. 2, the four pillars 35A to 35D corresponding to the four process cartridges 31A to 31D are mounted on the second lower surface 75, as described above. These pillars 35A to 35D are parallelly arranged at equal intervals in the anteroposterior direction, and orthogonally extend downward from the second lower surface 75. The front end edge of the second lower surface 75 is connected to the lower end edge of the front end face of the lower end portion of the second front wall 68. As hereinabove described, the front end face of the lower end portion of the second front wall 68 generally vertically extends, whereby the front end portion of the second lower surface 75 and the front end face of the lower end portion of the second front wall 68 form a step (referred to as a second step 94), inverted L-shaped in left-side elevational view, on the portion connecting the second lower wall 74 and the second front wall 68 with each other (see FIG. 1). In other words, the second casing 4 is chamfered on the connecting portion (continuous to the first inclined surface 16 on the second inclined surface 69, as described later) between the second lower wall 74 and the second front wall 68, so that this connecting portion is not pointed.

The second rear wall 59 is slightly thick in the anteroposterior direction, and provided with a slit (referred to as a sheet ejecting slit 76) longitudinal in the width direction on the front side thereof. A sheet ejecting path 77 is formed in the second rear wall 59. The sheet ejecting path 77 extends toward the sheet ejecting slit 76 continuously from the upper end of a transport path 57 of the first casing 3 while curving frontward. The second rear wall 59 stores three sheet ejecting rollers 80. These sheet ejecting rollers 80 are adjacently arranged at the back of the sheet ejecting slit 76 while two of the sheet ejecting rollers 80 are in contact with the remaining sheet ejecting roller 80.

A sheet ejection space 81 is formed in the second casing 4. The sheet ejection space 81 is generally in the form of an anteroposteriorly longitudinal rectangular parallelepiped surrounded by the second rear wall 59, the second right wall 60, the second left wall 61, the second upper wall 72 and the second lower wall 74. The sheet ejection space 81 communicates with the ejecting port 71 on the front side thereof, and communicates with the sheet ejecting slit 76 on the rear side thereof. A sheet ejection tray 78 as an example of a receiving portion is provided in the sheet ejection space 81. The sheet ejection tray 78, arranged on the second lower wall 74, is in the form of a plate extending upward toward the oblique front side in a curving manner from a lower portion of the sheet ejecting slit 76 to generally horizontally extend frontward. The front end of the sheet ejection tray 78, protruding from the second casing 4 through the ejecting port 71, is hereinafter referred to as a protruding portion 79.

The sheet ejecting path 77, the sheet ejection tray 78, the sheet ejecting rollers 80 and the sheet ejection space 81 described above form the aforementioned ejecting section 58. In other words, the second casing 4 includes the ejecting section 58, which is provided above the image forming section 10. The ejecting port 71 communicates with the ejecting section 58.

(2-2) Image Scanning Section

In the second casing 4, the image scanning section 11 is mounted on the second upper wall 72. The image scanning section 11 is provided above the ejecting section 58.

As shown in FIGS. 1 and 2, the image scanning section 11 includes a document board 82 connected to the second upper wall 72 (more specifically, embedded in the second upper wall 72) and a pressing cover 83 swingably supported on the document board 82.

The document board 82 is in the form of a plate rectangular in plan view similar to the second upper wall 72, and provided on the upper surface thereof with a glass surface 84 on which a document is placed. The glass surface 84 is coincident with the second upper surface 67 of the second upper wall 72. The document board 82 stores a CCD sensor 85 for reading the document placed on the glass surface 84. The CCD sensor 85 stands by on the left end (referred to as a standby position) of the glass surface 84, and slides rightward along the width direction (see a thick broken arrow in FIG. 1) in a state opposed to the glass surface 84 in normal document scanning operation. The sheets P are ejected to the ejecting section 58 (more specifically, to the sheet ejection tray 78) in the anteroposterior direction (see a thick solid arrow in FIG. 1), and hence the direction of movement (width direction; see the thick broken arrow in FIG. 1) of the CCD sensor 85 and the direction for ejecting the sheets P are orthogonal to each other when projected on the same plane in the top-and-bottom direction.

The pressing cover 83 is in the form of a plate rectangular in plan view, similar to the document board 82. The rear end portions of the pressing cover 83 and the document board 82 are connected with each other by a hinge 86, and the pressing cover 83 is swung between a closing position tilted to cover the glass surface 84 from above and an opening position uprighted to expose the glass surface 84 upward toward the oblique front side. As shown in FIG. 1, a recess (referred to as a grasp portion 101) is formed on the front end of the pressing cover 83, so that the user swings the pressing cover 83 by putting his/her fingers on the grasp portion 101. An ADF (auto document feeder) device 87 for automatically scanning the document is provided on the left end portion of the pressing cover 83. The ADF device 87 includes a box-like ADF casing 89 and a standby tray 88 in the form of a thin plate, generally rectangular in plan view, extending rightward from the right wall of the ADF casing 89. The ADF casing 89 includes a document transport roller (not shown) and a document sensor (not shown) therein. On the right wall of the ADF casing 89, an inlet (not shown) and an outlet (not shown) are formed on the upper and lower sides of the standby tray 88 respectively.

As shown in FIG. 2, the user swings the pressing cover 83 to the opening position and places the document on the glass surface 84, and thereafter swings the pressing cover 83 to the closing position and operates any of the buttons 91 of the operation panel 90 in a normal document scanning operation in this image scanning section 11. Thus, the CCD sensor 85 located on the standby position slides rightward from the left side in the state opposed to the document placed on the glass surface 84, to read image information from the document. Thereafter the user swings the pressing cover 83 to the opening position again and removes the document from the glass surface 84. The CCD sensor 85 automatically returns to the aforementioned standby position.

When the document sensor (not shown) detects that the document is set on the standby tray 88 (see FIG. 1) in an automatic document scanning operation with the ADF device 87, on the other hand, the CCD sensor 85 is fixed to an unshown automatic document scanning position, dissimilarly to the aforementioned normal document scanning operation. When the user operates any of the buttons 91, the document transport roller (not shown) of the ADF device 87 is rotated, so that the document is drawn by the document transport roller (not shown) to move leftward and introduced into the ADF casing 89 through the inlet (not shown). When the document introduced into the ADF casing 89 is opposed to the CCD sensor 85, the CCD sensor 85 reads the image information from the document. Thereafter the document is ejected from the outlet (not shown).

Thus, the image scanning section 11 reads the image information from the document. Then, the image forming section 10 creates image data on the basis of the image information read from the document in the aforementioned manner, and forms an image on the sheet P as described above.

(3) Opening/Closing of Second Casing with Respect to First Casing

The second casing 4 is relatively pivotable about the pivoting shaft 20 with respect to the first casing 3. More specifically, the second casing 4 pivots between the closing position and the opening position.

When the second casing 4 is on the closing position, the first upper surface 21 of the first casing 3 is in contact with the second lower surface 75 of the second casing 4 from below over the whole area, as shown in FIGS. 1 and 2. Thus, the second lower surface 75 of the second casing 4 covers the first upper surface 21 of the first casing 3 from above, and closes the mounting port 9. Further, the rear surfaces of the first and second rear walls 6 and 59 are flush with each other. The second step 94 engages with the first step 93, the lower end edge of the second inclined surface 69 is continuous with the upper end edge of the first inclined surface 16 from above, and the second inclined surface 69 and the first inclined surface 16 are flush with each other. The second inclined surface 69 and the first inclined surface 16 flush with each other are collectively referred to as an inclined surface 95. This inclined surface 95 is continuous along the first and second casings 3 and 4 and inclined along the direction (the aforementioned inclination direction) intersecting with the generally vertical surface (the first front surface 15) of the casing 2 closer to the ejecting port 71 and the generally horizontal surface (the second upper surface 67) of the casing 2, to connect the first front surface 15 and the second upper surface 67 with each other. As shown in FIG. 2, the inclination angle θ of the inclined surface 95 with respect to a horizontal surface 96 is not less than 30° and not more than 40°, more specifically 35°. When the second casing 4 is on the closing position, the LED elements 34A to 34D are adjacent to the corresponding photosensitive drums 22A to 22D from above, while the upper end of the transport path 57 and the lower end of the sheet ejecting path 77 are continuous with each other.

When the user grasps the protruding portion 79 of the sheet ejection tray 78 and pivots the second casing 4 counterclockwise in left-side elevational view nearly by 90° from the closing position, the second casing 4 is located on the opening position shown in FIG. 3. When the second casing 4 is on the opening position, the second lower surface 75 thereof completely separates from the first upper surface 21 of the first casing 3 upward, and is generally orthogonal to the first upper surface 21 in left-side elevational view. Thus, the first upper surface 21 and the mounting port 9 of the first casing 3 are open upward toward the oblique front side. Further, the rear surface of the second rear wall 59 is inclined rearward with respect to the rear surface of the first rear wall 6, so that the flush state of these rear surfaces is canceled. The second step 94 disengages from the first step 93, the second inclined surface 69 separates from the upper end edge of the first inclined surface 16 upward toward the oblique rear side, and the flush state of the second inclined surface 69 and the first inclined surface 16 is canceled. When the second casing 4 is on the opening position, further, all the LED elements 34A to 34D separate upward from the corresponding photosensitive drums 22A to 22D, more specifically, are located above the first upper surface 21 along with the pillars 35A to 35D.

2. Operation and Effect (1) As shown in FIG. 2, this printer 1 is of the so-called in-cylinder sheet ejection type having the image scanning section 11, the ejecting section 58 and the image forming section 10 successively arranged from above.

The first upper surface 21 of the first casing 3 including the image forming section 10 comes into contact with the second lower surface 75 of the second casing 4 including the image scanning section 11 and the ejecting section 58 over the whole area, whereby the second casing 4 is supported on the first casing 3. As shown in FIG. 1, the width-directional end edges of the second upper surface 67 and those of the second lower surface 75 are connected with each other over the whole areas by the second right surface 104 or the second left surface 105. In the second casing 4, therefore, sufficient strength can be ensured between the second upper surface 67 and the second lower surface 75. In the second casing 4, sufficient strength can consequently be ensured around the image scanning section 11. Thus, the second casing 4 can be prevented from such a disadvantage that the same is distorted between the second upper surface 67 and the second lower surface 75 due to the weight of the image scanning section 11 when moved with respect to the first casing 3, for example.

Further, the second casing 4 includes the ejecting section 58 along with the image scanning section 11, whereby the user can also move the ejecting section 58 by simply moving the second casing 4 with respect to the first casing 3 as shown in FIG. 3, to smoothly exchange any component (such as any one of the process cartridges 31, for example) provided in the first casing 3 by easily opening the first upper surface 21 of the first casing 3. Even if the sheets P are kept on the sheet ejection tray 78 when the user opens the second casing 4, there is no possibility that the sheets P fall from the sheet ejection tray 78 since the periphery of the ejecting port 71 is completely surrounded by the upper, lower, right and left walls and the rear wall of the second casing 4.

As shown in FIG. 1, in addition, the inclined surface 95 connecting the first front surface 15 (generally vertical surface) of the first casing 3 and the second upper surface 67 (generally horizontal surface) of the second casing 4 with each other is continuously provided along the first and second casings 3 and 4. The second lower surface 75 of the second casing 4 extends in the generally horizontal direction beyond the second upper surface 67, and hence the second casing 4 is narrowed from the second lower surface 75 toward the second upper surface 67. In other words, the inclined surface 95 is so formed as to notch the portion connecting the first front surface 15 of the first casing 3 and the second upper surface 67 of the second casing 4 with each other in side elevational view from the width direction. Therefore, the user can simultaneously observe the first front surface 15 of the first casing 3 and the second upper surface 67 (more specifically, the upper portion of the image scanning section 11) of the second casing 4 by turning his/her eyes X on the inclined surface 95 as shown in FIG. 2, whereby the state of the printer 1 can be grasped over a wide range, and the operability thereof can be improved.

(2) The user can take out the sheets P ejected to the ejecting section 58 and placed on the sheet ejection tray 78 by accessing the ejecting port 71 communicating with the ejecting section 58. The ejecting port 71 is formed on the inclined surface 95, whereby the user can easily grasp whether or not the sheets P are placed on the sheet ejection tray 78 by turning his/her eyes X on the inclined surface 95. Further, the user can easily move the second casing 4 with respect to the first casing 3 by grasping the portion (protruding portion 79) protruding from the ejecting port 71 in the sheet ejection tray 78.

(3) As shown in FIG. 1, the second casing 4 is chamfered on the portion of the second inclined surface 69 continuous with the first inclined surface 16 of the first casing 3. In other words, this portion is the aforementioned second step 94, which is not pointed. In the second casing 4, therefore, the strength of this portion can be improved.

(4) In the first casing 3, the first right and left walls 7 and 8 extending in the direction intersecting with the first inclined surface 16 are connected not to the first inclined surface 16 but to the first end faces 17 extending in the direction intersecting with the first inclined surface 16 from the width-directional end edges of the first inclined surface 16, respectively, with respect to the first front wall 5. Therefore, the width-directional end edges of the first inclined surface 16 and the end edges (front end edges) of the first right and left walls 7 and 8 are not coincident with each other. Similarly, the width-directional end edges of the second inclined surface 69 and the front end edges of the second right and left walls 60 and 61 are not coincident with each other in the second casing 4.

In other words, the portions connecting the first front wall 5 with the first right and left walls 7 and 8 respectively are arranged out of the corners of the first casing 3. More specifically, these connecting portions are arranged also out of the first inclined surface 16. Similarly, the portions connecting the second front wall 68 with the second right and left walls 60 and 61 respectively are arranged out of the corners of the second casing 4 and the second inclined surface 69. When the user turns his/her eyes X (see FIG. 2) on the inclined surface 95 (the first inclined surface 16 and the second inclined surface 69), therefore, these connecting portions hardly come into view, whereby the appearances of the first and second casings 3 and 4 are improved on the side of the inclined surface 95 (front side). Further, these connecting portions relatively inferior in strength are so arranged out of the corners, easily hit by external substances, of the first and second casings 3 and 4 that these connecting portions can be prevented from breakage.

(5) As shown in FIG. 2, this printer 1 is anteroposteriorly longitudinal due to the parallel arrangement of the plurality of photosensitive drums 22A to 22D along the generally horizontal direction (more specifically, along the anteroposterior direction). However, the inclined surface 95 connecting the first front surface 15 of the first casing 3 and the second upper surface 67 of the second casing 4 with each other notches the portion connecting the first front surface 15 with the second upper surface 67 (i.e., the front upper end portion of the casing 2), whereby the printer 1 can be miniaturized.

(6) The LED elements 34A to 34D mounted on the second casing 4 are relatively small-sized, whereby the printer 1 can be miniaturized. The LED elements 34A to 34D emitting light having a relatively short focal length must be arranged adjacently to the photosensitive drums 22A to 22D. When the second casing 4 is moved with respect to the first casing 3, therefore, the distance of movement of the second casing 4 is increased due to the LED elements 34A to 34D arranged adjacently to the photosensitive drums 22A to 22D. In other words, a long distance must be ensured for the second casing 4 pivoting from the closing position (see FIG. 2) to the opening position (see FIG. 3). While force acting on the second casing 4 may be increased as the distance of movement (pivoting) of the second casing 4 is increased, the width-directional end edges of the second upper surface 67 and those of the second lower surface 75 are connected with each other over the whole areas by the second right surface 104 or the second left surface 105 in the second casing 4 as hereinabove described, whereby sufficient strength is ensured between the second upper surface 67 and the second lower surface 75. In other words, sufficient strength can be ensured between the second upper surface 67 and the second lower surface 75, more specifically around the image scanning section 11 in the second casing 4, even if the distance of pivoting of the second casing 4 from the closing position to the opening position is increased due to the employment of the LED elements 34A to 34D.

Second Embodiment

While a direct transfer type color printer which directly transfers the toner images from the plurality of photosensitive drums 22A to 22D to the sheet P is illustrated in the above embodiment, one or more aspects of the present invention is not limited to this but is also applicable to a monochromatic printer or an intermediate transfer type color printer which temporarily transfers toner images from photosensitive drums 22 to an intermediate transfer member and thereafter collectively transfers the same to a sheet P. While the photosensitive drums 22A to 22D are exposed with the LED elements 34A to 34D, one or more aspects of the present invention is also applicable to a laser printer exposing photosensitive drums 22A to 22D with laser beams.

Figure 4:
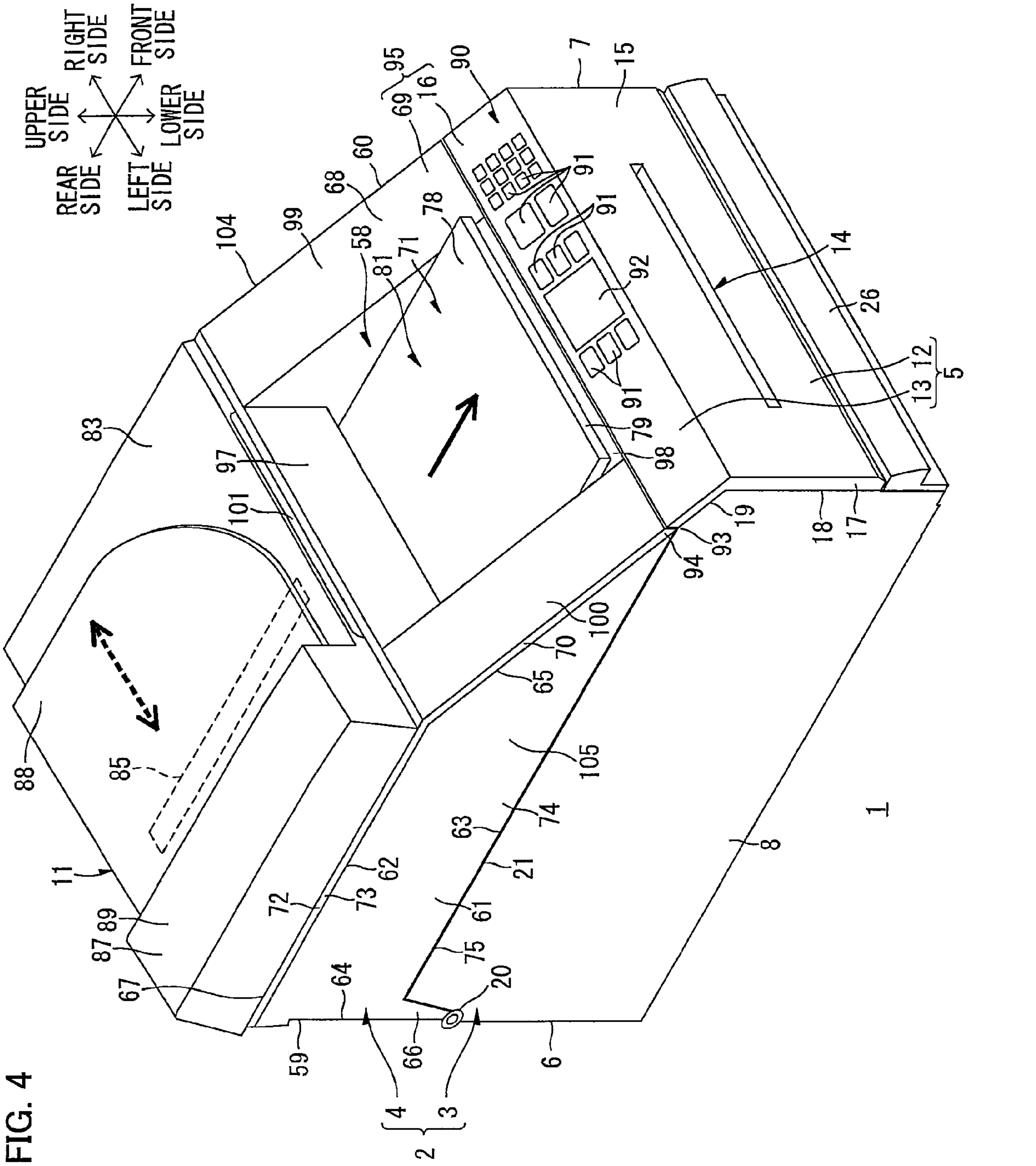
FIG. 4 illustrates a modification applied to FIG. 1.

FIG. 4 illustrates a modification applied to FIG. 1. The inclined surface 95 may not be inclined over the whole areas of the front surfaces of the inclined portion 13 of the first front wall 5 and the second front wall 68, but a part (the upper inclined surface 97 above the ejecting port 71) of the inclined surface 95 may be a generally vertical surface as shown in FIG. 4, for example. Further, the operation panel 90 may be provided on the side of the first casing 3 (more specifically, on the first inclined surface 16), as shown in FIG. 4. In this case, a wire harness (not shown) can be easily connected from a main board (not shown) provided in the first casing 3 to the operation panel 90 at a short distance, for example, as compared with the case of arranging the operation panel 90 on the second casing 4.

The embodiments described above are illustrative and explanatory of the invention. The foregoing disclosure is not intended to be precisely followed to limit the present invention. In light of the foregoing description, various modifications and alterations may be made by embodying the invention. The embodiments are selected and described for explaining the essentials and practical application schemes of the present invention which allow those skilled in the art to utilize the present invention in various embodiments and various alterations suitable for anticipated specific use. The scope of the present invention is to be defined by the appended claims and their equivalents.

What is claimed is:

1. An image forming apparatus comprising:

a first casing including an image forming section for forming an image on a recording medium; and a second casing, arranged above the first casing, including an ejecting section to which the recording medium formed with the image at the image forming section is ejected, and an image scanning section provided above the ejecting section and capable of reading image information from a document, wherein the second casing is provided with an upper surface including a generally horizontal surface, a lower surface extending beyond the upper surface in a generally horizontal direction and a side surface connecting an end edge of the upper surface and an end edge of the lower surface with each other, wherein the first casing is provided with an upper surface coming into contact with the lower surface of the second casing and a side surface including a generally vertical surface, wherein an inclined surface connecting the generally vertical surface of the first casing and the generally horizontal surface of the second casing with each other, is provided continuously along the first casing and the second casing, wherein the inclined surface includes a first inclined surface provided on the first casing and a second inclined surface provided on the second casing, and wherein the second casing is chamfered on a portion of the second inclined surface continuous with the first inclined surface.

2. The image forming apparatus according to claim 1, wherein an ejecting port communicating with the ejecting section is formed on the inclined surface in the second casing, and the ejecting section includes a receiving portion receiving the recording medium formed with the image at the image forming section, and the receiving portion protrudes outward from the ejecting port.

3. The image forming apparatus according to claim 1, wherein the first casing comprises:

a first inclined wall having the first inclined surface and a first end face extending in a direction intersecting with the first inclined surface from an end edge of the first inclined surface; and a first side wall, extending in a direction intersecting with the first inclined surface, connected to the first end face, and the second casing comprises:

a second inclined wall having the second inclined surface and a second end face extending in a direction intersecting with the second inclined surface from an end edge of the second inclined surface; and a second side wall, extending in a direction intersecting with the second inclined surface, connected to the second end face.

4. The image forming apparatus according to claim 1, wherein the image forming section includes a plurality of image carriers which are parallelly arranged along the generally horizontal direction in the first casing and on which electrostatic latent images are formed.

5. An image forming apparatus comprising:

a first casing including an image forming section for forming an image on a recording medium; and a second casing, arranged above the first casing, including an ejecting section to which the recording medium formed with the image at the image forming section is ejected, and an image scanning section provided above the ejecting section and capable of reading image information from a document, wherein the second casing is provided with an upper surface including a generally horizontal surface, a lower surface extending beyond the upper surface in a generally horizontal direction and a side surface connecting an end edge of the upper surface and an end edge of the lower surface with each other, wherein the first casing is provided with an upper surface coming into contact with the lower surface of the second casing and a side surface including a generally vertical surface, wherein an inclined surface connecting the generally vertical surface of the first casing and the generally horizontal surface of the second casing with each other, is provided continuously along the first casing and the second casing, wherein the image forming section includes a plurality of image carriers which are parallelly arranged along the generally horizontal direction in the first casing and on which electrostatic latent images are formed, and wherein an LED element for forming the electrostatic latent image by exposing the image carrier is mounted on the second casing.

6. The image forming apparatus according to claim 5, wherein the inclined surface includes a first inclined surface provided on the first casing and a second inclined surface provided on the second casing, and the second casing is chamfered on a portion of the second inclined surface continuous with the first inclined surface.

7. The image forming apparatus according to claim 5, wherein the first casing comprises:

a first inclined wall having the first inclined surface and a first end face extending in a direction intersecting with the first inclined surface from an end edge of the first inclined surface; and a first side wall, extending in a direction intersecting with the first inclined surface, connected to the first end face, and wherein the second casing comprises:

a second inclined wall having the second inclined surface and a second end face extending in a direction intersecting with the second inclined surface from an end edge of the second inclined surface; and a second side wall, extending in a direction intersecting with the second inclined surface, connected to the second end face.

* * * * *